US012781099B2

(12) United States Patent
Zhang et al.

(10) Patent No.: US 12,781,099 B2
(45) Date of Patent: Nov. 3, 2026

(54) SECONDARY CURED UV PRESSURE-SENSITIVE ADHESIVE, AND PREPARATION METHODS FOR SAME AND EXPLOSION-PROOF FILM

(71) Applicant: HUBEI INSTITUTE OF AEROSPACE CHEMICAL TECHNOLOGY, Xiangyang (CN)

(72) Inventors: Hongyuan Zhang, Xiangyang (CN); Tao Xu, Xiangyang (CN); Guoqi Luo, Xiangyang (CN); Dongfang Liu, Xiangyang (CN); Yan Cai, Xiangyang (CN); Ping Xia, Xiangyang (CN); Jun Yao, Xiangyang (CN); Ning Zhang, Xiangyang (CN); Zhu Yang, Xiangyang (CN)

(73) Assignee: HUBEI INSTITUTE OF AEROSPACE CHEMICAL TECHNOLOGY, Hubei (CN)

( * ) Notice: Subject to any disclaimer, the term of this patent is extended or adjusted under 35 U.S.C. 154(b) by 78 days.

(21) Appl. No.: 18/714,707

(22) PCT Filed: Jul. 21, 2022

(86) PCT No.: PCT/CN2022/107170
§ 371 (c)(1),
(2) Date: May 30, 2024

(87) PCT Pub. No.: WO2023/098104
PCT Pub. Date: Jun. 8, 2023

(65) Prior Publication Data

US 2025/0019574 A1 Jan. 16, 2025

(30) Foreign Application Priority Data

Dec. 1, 2021 (CN) ........................ 202111454073.4

(51) Int. Cl.

| | |
|---|---|
| ***C09J 7/38*** | (2018.01) |
| ***B32B 7/12*** | (2006.01) |
| ***B32B 37/12*** | (2006.01) |
| ***B32B 38/00*** | (2006.01) |
| ***C09J 5/00*** | (2006.01) |
| ***C09J 7/25*** | (2018.01) |

(52) U.S. Cl.
CPC .................. *C09J 7/38* (2018.01); *B32B 7/12* (2013.01); *C09J 5/00* (2013.01); *C09J 7/255* (2018.01); *B32B 2037/1253* (2013.01); *B32B 38/0008* (2013.01); *B32B 2255/10* (2013.01); *B32B 2255/26* (2013.01); *C09J 2301/302* (2020.08); *C09J 2301/414* (2020.08); *C09J 2301/416* (2020.08)

(58) Field of Classification Search
CPC ....... C09J 7/38; C09J 5/00; C09J 7/255; C09J 2301/302; C09J 2301/414; C09J 2301/416; C09J 2203/346; C09J 7/385; C09J 2467/006; C09J 4/06; B32B 7/12; B32B 38/008; B32B 2037/1253; B32B 2255/10; B32B 2255/26
See application file for complete search history.

(56) References Cited

U.S. PATENT DOCUMENTS

| | | | | |
|---|---|---|---|---|
| 6,676,795 | B1 | 1/2004 | Levandoski | |
| 2012/0059127 | A1* | 3/2012 | Ha ........................ | C09J 133/14 525/327.2 |
| 2018/0185964 | A1* | 7/2018 | Yokoi .................. | B23K 26/351 |
| 2021/0139754 | A1 | 5/2021 | Ishii et al. | |

FOREIGN PATENT DOCUMENTS

| | | | |
|---|---|---|---|
| CN | 101230177 | A | 7/2008 |
| CN | 101649165 | A | 2/2010 |
| CN | 102533133 | A | 7/2012 |
| CN | 106398563 | A | 2/2017 |
| CN | 106661376 | A | 5/2017 |
| CN | 106995665 | A | 8/2017 |
| CN | 109135588 | A | 1/2019 |
| CN | 109651961 | A | 4/2019 |

(Continued)

OTHER PUBLICATIONS

Machine translation of CN 110467890-A (Year: 2019).*

(Continued)

*Primary Examiner* — Jessica M Roswell

(74) *Attorney, Agent, or Firm* — Wolter Van Dyke Davis, PLLC; Eugene Molinelli; Michael W. Taylor

(57) ABSTRACT

Provided are a secondary cured UV pressure-sensitive adhesive, and preparation methods for same and an explosion-proof film. The secondary cured UV pressure-sensitive adhesive is composed of the following materials, in percentages by mass: 31-35% of a hydroxyl-containing polyacrylate prepolymer, 6-9% of pentaerythritol triacrylate, 3-5% of 2-hydroxyl-3-phenoxy propane acrylate, 2-3% of an isocyanate curing agent, 2-3% of photo initiator 184, and 50% of ethyl acetate. The secondary cured UV pressure-sensitive adhesive is prepared by carrying out a thermal curing cross-linking reaction of a hydroxyl-containing polyacrylate prepolymer, pentaerythritol triacrylate and 2-hydroxyl-3-phenoxy propane acrylate by using an isocyanate curing agent, and initiating a free radical polymerization of pentaerythritol triacrylate and 2-hydroxyl-3-phenoxy propane acrylate by using photo initiator 184.

9 Claims, No Drawings

(56) References Cited

FOREIGN PATENT DOCUMENTS

| | | | | | |
|---|---|---|---|---|---|
| CN | 110467890 | A | * 11/2019 | .............. | C09J 7/385 |
| CN | 110527464 | A | 12/2019 | | |
| CN | 112280487 | A | 1/2021 | | |
| CN | 112513212 | A | 3/2021 | | |
| CN | 112743947 | A | 5/2021 | | |
| CN | 113372824 | A | 9/2021 | | |
| CN | 113667423 | A | 11/2021 | | |
| CN | 113683972 | A | 11/2021 | | |
| CN | 113969111 | A | 1/2022 | | |
| KR | 10-2008-0038471 | A | 5/2008 | | |
| WO | 2015/074611 | A1 | 5/2015 | | |

OTHER PUBLICATIONS

International Search Report and Written Opinion received for PCT Patent Application No. PCT/CN2022/107170, mailed on Oct. 26, 2022, 18 pages (9 pages of English Translation and 9 pages of Original Document).

Jianqing et al., "Packaging Materials Science", China Light Industry Press, Jan. 31, 2009, pp. 296-298.

Li Zidong, "Practical Adhesion Handbook" Shanghai Scientific and Technological Literature Publishing House, Apr. 30, 1987, pp. 337-338.

Notice of Allowance received for Chinese Application No. 202111454073.4, mailed on Oct. 19, 2023, 2 pages (1 page of original office action and 1 page of English Translation).

Office Action and Search Report received for Chinese Application No. 202111454073.4, mailed on Nov. 28, 2022, 13 pages (6 pages of original office action and 7 pages of English Translation).

Office Action received for Chinese Application No. 202111454073, mailed on Jul. 7, 2023, 14 pages (7 pages of original office action and 7 pages of English Translation).

Office Action received for Chinese Application No. 202111454073.4, mailed on Apr. 22, 2023, 12 pages (7 pages of original office action and 6 pages of English Translation).

* cited by examiner

SECONDARY CURED UV PRESSURE-SENSITIVE ADHESIVE, AND PREPARATION METHODS FOR SAME AND EXPLOSION-PROOF FILM

CROSS-REFERENCE TO RELATED APPLICATIONS

This application is a U.S. National Stage Application, which claims priority to International Application No. PCT/CN2022/107170, filed Jul. 21, 2022, which claims priority to the Chinese patent application with the filling No. CN202111454073.4 filed with the Chinese Patent Office on Dec. 1, 2021, and entitled "SECONDARY CURED UV PRESSURE-SENSITIVE ADHESIVE, AND PREPARATION METHODS FOR SAME AND EXPLOSION-PROOF FILM", the contents of which are incorporated herein by reference in entirety.

TECHNICAL FIELD

The present disclosure relates to a UV pressure-sensitive adhesive, and preparation methods for an explosion-proof film, and particularly to a secondary cured UV pressure-sensitive adhesive, and preparation methods for same and explosion-proof film.

BACKGROUND ART

With the gradual improvement of safety awareness among people, applying explosion-proof film to various glass surfaces has become a fundamental choice in consumer demand. In order to prevent external intrusion, strong impact from objects, and serious injuries to the human body caused by glass breakage, the development of a variety of functional explosion-proof films has emerged. The explosion-proof film affixed to the surface of the glass can not only reduce the risk of glass breakage but also reduce various injuries caused by glass breakage. In addition, by adding ultraviolet absorbers and infrared heat insulators into the UV-curable layer and pressure-sensitive adhesive layer, people endow the explosion-proof film with new functionalities, which possesses the capabilities of blocking harmful ultraviolet rays in sunlight, preventing interior decorations from fading or discoloration, and reducing heat conduction from the exterior. This not only provides certain thermal insulation effects but also energy-saving benefits. During the process of applying the explosion-proof film to the surfaces of various glass products, the explosion-proof film develops certain defects on the glass surface due to various reasons such as dust, foreign objects, and air bubbles, which affect the aesthetics. Therefore, it is necessary to remove and reapply the explosion-proof film. Since the cohesive strength of pressure-sensitive adhesive is less than the interface bonding strength, it is very easy to form residual adhesive on the glass surface during the process of film tearing, and it is also easy to cause a decrease in cohesive strength due to aging during the process of use, resulting in residual adhesive and bubbles, which makes it difficult to clean up the residual adhesive.

In the prior art, the disclosed explosion-proof film has problems such as low peeling strength and insufficient resistance to external impact forces, which leads to a need for enhanced safety when glass breaks. Certain explosion-proof films in prior art primarily address the issues of flame retardancy and thermal insulation, without clear specifications on the peeling strength and aging resistance. Consequently, during usage, residual adhesive on the glass surface often forms when removing the film, which limits the scope of application.

SUMMARY

The present disclosure provides a secondary cured UV pressure-sensitive adhesive, consisting of the following materials in mass percent:

| | |
|---|---|
| a hydroxyl-containing polyacrylate prepolymer | 31-35%, |
| pentaerythritol triacrylate | 6-9%, |
| 2-hydroxyl-3-phenoxy propane acrylate | 3-5%, |
| an isocyanate curing agent | 2-3%, |
| photo initiator 184 | 2-3%, and |
| ethyl acetate | 50%. |

The cross-linking and curing of the UV pressure-sensitive adhesive is accomplished by the following steps. Firstly, a thermal curing cross-linking reaction between hydroxyl-containing polyacrylate prepolymer, pentaerythritol triacrylate and 2-hydroxyl-3-phenoxy propane acrylate is carried out by using an isocyanate curing agent, thus forming an interpenetrating network structure. Secondly, under the UV irradiation, a free radical polymerization of pentaerythritol triacrylate and 2-hydroxyl-3-phenoxy propane acrylate is initiated by using photo initiator 184, thus completing the photo-curing cross-linking reaction.

In some embodiments, the hydroxyl-containing polyacrylate prepolymer is prepared by the following raw materials in parts by weight: 20 to 23 parts of n-butyl acrylate, 10 to 13 parts of tetrahydrofurfuryl acrylate, 8 to 10 parts of hydroxyethyl acrylate, 3 to 4 parts of acrylic acid, 3 to 4 parts of benzoyl peroxide, and 50 parts of ethyl acetate.

In some embodiments, the secondary cured UV pressure-sensitive adhesive has a solid content of 22±1%. Under environmental conditions of 23±1° C. and relative humidity of 55±5%, a thickness of adhesive is 15±1 μm, and a 180° peeling strength on a 50 μm PET film is ≥1200 g/25 mm. A transparency is ≥90%, and a haze is ≤1.5%. After aging for 96 h under high temperature and high humidity conditions of temperature of 70±2° C. and relative humidity of 90%~95%, there is no residual adhesive when the PET film is peeled off from the tempered glass. After aging for 720 h in an 80±2° C. oil bath oven, there is no residual adhesive or bubbles when the PET film is peeled off from the tempered glass.

The present disclosure also provides a preparation method for a secondary cured UV pressure-sensitive adhesive, comprising the following steps.

1) Synthesis of hydroxyl-containing polyacrylate prepolymer: according to weight parts, weighing 20 to 23 parts of n-butyl acrylate, 10 to 13 parts of tetrahydrofurfuryl acrylate, 8 to 10 parts of hydroxyethyl acrylate, 3 to 4 parts of acrylic acid, 3 to 4 parts of benzoyl peroxide, respectively, adding them to a four-neck flask, mixing them evenly with 50 parts of ethyl acetate, and subjecting them to random copolymerization using a free radical polymerization process to obtain a hydroxyl-containing polyacrylate prepolymer.
2) Preparation of secondary cured UV pressure-sensitive adhesive: according to mass percent, weighing the hydroxyl-containing polyacrylate prepolymer at 31%~35%, pentaerythritol triacrylate at 6%~9%, 2-hydroxyl-3-phenoxy propane acrylate at 3%~5%, isocyanate curing agent at 2%~3%, photo initiator 184 at 2%~3%, and ethyl acetate at 50%, respectively; and in a light-shielded environment, uniformly dispersing and stirring them after contained in a black container to obtain a secondary cured UV pressure-sensitive adhesive.

In some embodiments, the free radical polymerization process specifically includes: transferring a monomer mixture solution to a constant-pressure dropping funnel, and mounting a 1000 ml four-neck flask, stirring paddle, spherical condenser tube, thermometer, and constant-pressure dropping funnel on a constant-temperature water bath at 80±5° C.; dripping the monomer mixture solution, which accounts for 15% by mass, into the four-neck flask; stirring and reacting for 10 to 15 minutes until a temperature of the reactants rises above 90° C.; dripping, when the viscosity increases, the monomer mixture solution from the constant-pressure dropping funnel; controlling the dripping rate, and stabilizing the reaction temperature at 80±5° C.; and after completing the dripping, continuing refluxing and reacting for 1.5 to 2.5 hours, then stopping heating the reaction, and cooling down, so as to obtain a hydroxyl-containing polyacrylate prepolymer.

The present disclosure also provides a secondary cured UV pressure-sensitive adhesive prepared and obtained by the preparation method for the secondary cured UV pressure-sensitive adhesive.

The present disclosure also provides a preparation method for an explosion-proof film, comprising the following steps: coating the aforementioned secondary cured UV pressure-sensitive adhesive on a surface of a 50 μm PET film by using a comma roll coating method, and after drying in the coating machine oven, laminating with a PET release film during winding; then, on the other surface of the PET film containing the pressure-sensitive adhesive, coating a UV-curable liquid on the surface of the PET film by using a micro-concave roll coating method; and after drying in the coating machine oven, curing with UV light irradiation, winding up, and maturing at room temperature for 7 days, thus preparing the explosion-proof film.

In some embodiments, the preparation method for the explosion-proof film includes the following steps.

1) The preparation of the coating solution of second cured UV pressure-sensitive adhesive: diluting the aforementioned secondary cured UV pressure-sensitive adhesive with ethyl acetate to a coating solution with a solid content of 22±1%.
2) The coating of the UV pressure-sensitive adhesive layer: mounting a 50 μm PET film on the unwinding stand of the coating machine, guiding the film, and adjusting the gap between the comma roll and the PET film with a stainless steel feeler gauge to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.
3) The coating of the UV-curable layer: diluting the UV-curable liquid with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C., respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

In some embodiments, the corona layer of the PET film is obtained by corona discharge treatment of the PET film.

The present disclosure also provides an explosion-proof film prepared and obtained by the preparation method for the explosion-proof film.

The present disclosure also provides use of the aforementioned secondary cured UV pressure-sensitive adhesive or the explosion-proof film in automobiles, buildings, computer products, communication products, or consumer electronics.

DETAILED DESCRIPTION OF EMBODIMENTS

To provide a clearer understanding of the objective, technical solution, and advantages of embodiments of the present disclosure, the technical solution of the embodiments of the present disclosure will be described in a clear and comprehensive manner. If specific conditions are not specified in the embodiments, it should be understood that the embodiment follows standard conditions or the conditions recommended by the manufacturer. Reagents or instruments not specified by a manufacturer are conventional products that can be commercially obtained.

Some embodiments of the present disclosure provide a secondary cured UV pressure-sensitive adhesive comprising the following components in mass percent:

| | |
|---|---|
| a hydroxyl-containing polyacrylate prepolymer | 31%-35%, |
| pentaerythritol triacrylate | 6%-9%, |
| 2-hydroxyl-3-phenoxy propane acrylate | 3%-5%, |
| an isocyanate curing agent | 2%-3%, |
| photo initiator 184 | 2%-3%, and |
| ethyl acetate | 50%. |

The secondary cured UV pressure-sensitive adhesive is provided, wherein the cross-linking and curing of the UV pressure-sensitive adhesive is accomplished by the following steps. Firstly, a thermal curing cross-linking reaction between hydroxyl-containing polyacrylate prepolymer, pentaerythritol triacrylate, and 2-hydroxyl-3-phenoxy propane acrylate is carried out by using an isocyanate curing agent, thus forming an interpenetrating network structure. Secondly, a free radical polymerization of pentaerythritol triacrylate and 2-hydroxyl-3-phenoxy propane acrylate is initiated by using photo initiator 184, thus completing the photo-curing cross-linking reaction.

In some embodiments, the secondary cured UV pressure-sensitive adhesive comprises the following components in mass percent.

The hydroxyl-containing polyacrylate prepolymer can be of 31%, 32%, 33%, 34%, and 35%; the pentaerythritol triacrylate can be of 6%, 7%, 8%, and 9%; the 2-hydroxyl-3-phenoxy propane acrylate can be of 3%, 3.5%, 4%, 4.5%, and 5%; the isocyanate curing agent can be of 2%, 2.2%, 2.4%, 2.6%, 2.8%, and 3%; the photo initiator 184 can be of 2%, 2.2%, 2.4%, 2.6%, 2.8%, and 3%; and the ethyl acetate is of 50%.

In some embodiments, the hydroxyl-containing polyacrylate prepolymer is obtained by preparing the following raw materials from the following parts by weight: 20 to 23 parts of n-butyl acrylate, 10 to 13 parts of tetrahydrofurfuryl acrylate, 8 to 10 parts of hydroxyethyl acrylate, 3 to 4 parts of acrylic acid, 3 to 4 parts of benzoyl peroxide, and 50 parts of ethyl acetate.

In some embodiments, the hydroxyl-containing polyacrylate prepolymer is obtained by preparing the following raw materials from the following parts by weight. The n-butyl acrylate can be of 20 parts, 20.5 parts, 21.5 parts, 22 parts, 22.5 parts, and 23 parts; the tetrahydrofurfuryl acrylate can be of 10 parts, 10.5 parts, 11 parts, 11.5 parts, 12 parts, 12.5 parts, and 13 parts; the hydroxyethyl acrylate can be of 8 parts, 8.5 parts, 9 parts, 9.5 parts, and 10 parts; the acrylic acid can be of 3.2 parts, 3.4 parts, 3.6 parts, 3.8 parts, and 4 parts; the benzoyl peroxide can be of 3.2 parts, 3.4 parts, 3.6 parts, 3.8 parts, 4 parts; and the ethyl acetate is of 50 parts.

In some embodiments, the secondary cured UV pressure-sensitive adhesive has a solid content of 22±1%. Under environmental conditions of 23±1° C. and relative humidity of 55±5%, a thickness of the adhesive is 15±1 μm, and a 180° peeling strength on a 50 μm PET film is ≥1200 g/25 mm. A transparency is ≥90%, and a haze is ≤1.5%. After aging for 96 hours under high temperature and high humidity conditions of 70±2° C. and relative humidity of 90%~95%, there is no residual adhesive when the PET film is peeled off from the tempered glass. After aging for 720 hours in an 80±2° C. oil bath oven, there is no residual adhesive or bubbles when the PET film is peeled off from the tempered glass.

Some embodiments of the present disclosure disclose a preparation method for the secondary cured UV pressure-sensitive adhesive, comprising the following steps.

1) Synthesis of hydroxyl-containing polyacrylate prepolymer: according to the raw material formulation of hydroxyl-containing polyacrylate prepolymer, weighing n-butyl acrylate, tetrahydrofurfuryl acrylate, hydroxyethyl acrylate, acrylic acid, and benzoyl peroxide, respectively; adding them to a four-neck flask, mixing them evenly with 50 parts of ethyl acetate, and subjecting them to random copolymerization using a free radical polymerization process to obtain a hydroxyl-containing polyacrylate prepolymer.
2) Preparation of secondary cured UV pressure-sensitive adhesive: according to the raw material formulation of the secondary cured UV pressure-sensitive adhesive, weighing the hydroxyl-containing polyacrylate prepolymer, pentaerythritol triacrylate, 2-hydroxyl-3-phenoxy propane acrylate, isocyanate curing agent, photo initiator 184 and ethyl acetate, respectively; and in a light-shielded environment, uniformly dispersing and stirring them after contained in a black container to obtain a secondary cured UV pressure-sensitive adhesive.

In some embodiments, the free radical polymerization process specifically includes: transferring a monomer mixture solution to a constant-pressure dropping funnel, mounting a 1000 ml four-neck flask, stirring paddle, spherical condenser tube, thermometer, and constant-pressure dropping funnel on a constant-temperature water bath at 80±5° C.; dripping the monomer mixture solution, which accounts for 15% by mass, into the four-neck flask; stirring and reacting for 10 to 15 minutes until a temperature of the reactants rises above 90° C.; dripping, when the viscosity increases, the monomer mixture solution from the constant-pressure dropping funnel; controlling the dripping rate, and stabilizing the reaction temperature at 80±5° C.; after completing the dripping, continuing refluxing and reacting for 1.5 to 2.5 hours, then stopping heating the reaction, and cooling down, so as to obtain a hydroxyl-containing polyacrylate prepolymer.

Some embodiments of the present disclosure further provide a secondary cured UV pressure-sensitive adhesive prepared and obtained by the preparation method for the secondary cured UV pressure-sensitive adhesive.

The present disclosure also provides a preparation method for an explosion-proof film, comprising the following steps: preparing the secondary cured UV pressure-sensitive adhesive in accordance with the mass percent content of the components in the raw material formulation of the secondary cured UV pressure-sensitive adhesive as described above, coating the UV pressure-sensitive adhesive on a surface of a 50 μm PET film by using a comma roll coating method, and after drying in the coating machine oven, laminating with a PET release film during winding; then, on the other surface of the PET film containing the pressure-sensitive adhesive, coating a UV-curable liquid on the surface of the PET film by using a micro-concave roll coating method; and after drying in the coating machine oven, curing with UV light irradiation, winding up, and maturing at room temperature for 7 days, thus preparing the explosion-proof film.

In some embodiments, the preparation method for the explosion-proof film includes the following steps.

1) The preparation of the coating solution of second cured UV pressure-sensitive adhesive: diluting the secondary cured UV pressure-sensitive adhesive with ethyl acetate to a coating solution with a solid content of 22±1%.
2) The coating of the UV pressure-sensitive adhesive layer: mounting a 50 μm PET film on the unwinding stand of the coating machine, guiding the film, adjusting the gap between the comma roll and the PET film to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the diluted UV pressure-sensitive adhesive coating solution onto a surface of a corona layer of the PET film (that is, the surface of the corona-treated PET film), drying in the coating machine oven, and controlling the thickness of the dry adhesive to 15±1 μm; and during winding, laminating with a PET release film treated with a release agent.
3) The coating of the UV-curable layer: diluting the commercially available UV-curable liquid with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

In some embodiments, the corona layer of the PET film is obtained by corona discharge treatment of the PET film.

Some embodiments of the present disclosure further provide an explosion-proof film prepared and obtained by the preparation method for the explosion-proof film.

The present disclosure also provides use of the aforementioned secondary cured UV pressure-sensitive adhesive or the explosion-proof film in the following fields: automotive field, such as for the explosion proof of automotive glass; building field, such as for office partitions, explosion proof of bank counter glass, or for the explosion proof of glass in malls, supermarkets, and museum displays; computer product field, such as for the explosion proof of high-end computer screens; communication product field, such as for the explosion proof of high-end mobile phone screens; and consumer electronic product field.

The present disclosure provides a secondary cured UV pressure-sensitive adhesive. After thermal curing, the secondary cured UV pressure-sensitive adhesive is endowed with relatively high initial adhesion. UV light irradiation curing completes the free radical polymerization reactions of both the UV-curable liquid and the UV pressure-sensitive adhesive simultaneously, imparting the pressure-sensitive adhesive with relatively high cohesive strength. This reduces the risk of the residual adhesive of the explosion-proof film on the surface of the protected material.

(1) The present disclosure utilizes a free radical polymerization process to randomly copolymerize n-butyl acrylate, tetrahydrofurfuryl acrylate, hydroxyethyl acrylate, acrylic acid, and benzoyl peroxide, thus obtaining a hydroxyl-containing polyacrylate prepolymer. The large molecule resin with relatively low cohesive strength possesses excellent initial adhesion and good wetting properties on various material surfaces. The macromolecular chain comprises reactive-OH groups, which facilitate chemical reactions with other reactive groups.

(2) The present disclosure applies an isocyanate curing agent to carry out a thermal curing cross-linking reaction among polyacrylate prepolymer containing active-OH groups, pentaerythritol triacrylate, and 2-hydroxyl-3-phenoxy propane acrylate, thus forming an interpenetrating network structure. The pressure-sensitive adhesive with this structure is applied to the production of explosion-proof film. During the curing of UV light irradiation, the curing and cross-linking of the UV-curable layer and the UV pressure-sensitive adhesive are simultaneously completed. It improves both the surface hardness of the UV-curable liquid and, at the same time, the cohesive strength and peeling strength of the pressure-sensitive adhesive.

(3) By employing the appropriate curing agents and the ratio of adding the photo-curable monomers, the peeling strength of the UV pressure-sensitive adhesive can be effectively regulated. Through the secondary curing cross-linking reaction, the two large molecule resins are cross-linked together. The increased cross-linking density reduces the risk of the pressure-sensitive adhesive forming a residual adhesive on the surface of the protected material.

EXAMPLES

The present disclosure tests the initial adhesion, 180° peeling strength after room-temperature maturing, resistance to high-temperature and high-humidity aging, and resistance to high temperature of explosion-proof films prepared from UV pressure-sensitive adhesives by means of the following examples and comparative examples.

Example 1

1) Preparation of Hydroxyl-Containing Polyacrylate Prepolymer

A hydroxyl-containing polyacrylate prepolymer was obtained by a free radical polymerization process using the components with the following weight parts as raw materials:

22 parts of n-butyl acrylate,
13 parts of tetrahydrofurfuryl acrylate,
8 parts of hydroxyethyl acrylate,
4 parts of acrylic acid,
3 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 35%, |
| pentaerythritol triacrylate | 8%, |
| 2-hydroxyl-3-phenoxy propane acrylate | 3%, |
| the isocyanate curing agent | 2%, |
| photo initiator 184 | 2%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a stainless steel feeler gauge of 0.07-0.1 mm to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/$cm^2$; and winding up, and maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1. It is noted that the UV-curable liquid used in all embodiments of the present disclosure can be selected from any UV-curable liquid from a common commercially available source and is not limited to the model selected in the embodiments.

Example 2

1) Preparation of Hydroxyl-Containing Polyacrylate Prepolymer

A hydroxyl-containing polyacrylate prepolymer was obtained by a free radical polymerization process using the components with the following weight parts as raw materials:

23 parts of n-butyl acrylate,
10 parts of tetrahydrofurfuryl acrylate,
10 parts of hydroxyethyl acrylate,
3 parts of acrylic acid,
4 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 33%, |
| pentaerythritol triacrylate | 6%, |
| 2-hydroxyl-3-phenoxy propane acrylate | 5%, |
| the isocyanate curing agent | 3%, |
| photo initiator 184 | 3%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a 0.07~0.1 mm stainless steel feeler gauge to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/$cm^2$; and winding up, and maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

Example 3

1) Preparation of Hydroxyl-Containing Polyacrylate Prepolymer

A hydroxyl-containing polyacrylate prepolymer was obtained by a free radical polymerization process using the components with the following weight parts as raw materials:

20 parts of n-butyl acrylate,
13 parts of tetrahydrofurfuryl acrylate,
10 parts of hydroxyethyl acrylate,
4 parts of acrylic acid,
3 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 31%, |
| pentaerythritol triacrylate | 9%, |
| 2-hydroxyl-3-phenoxy propane acrylate | 4%, |

-continued

| | |
|---|---|
| the isocyanate curing agent | 3%, |
| photo initiator 184 | 3%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a stainless steel feeler gauge of 0.07-0.1 mm to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

Example 4

1) Preparation of Hydroxyl-Containing Polyacrylate Prepolymer

A hydroxyl-containing polyacrylate prepolymer was obtained by a free radical polymerization process using the components with the following weight parts as raw materials:

21 parts of n-butyl acrylate, 13 parts of tetrahydrofurfuryl acrylate, 8 parts of hydroxyethyl acrylate, 4 parts of acrylic acid, 4 parts of benzoyl peroxide, and 50 parts of ethyl acetate.

The temperature of the free radical polymerization reaction was controlled at 80-85° C., the dropping time of the constant pressure funnel was 1.5 hours, and the reflux reaction was lasted for 2.5 hours.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 32%, |
| pentaerythritol triacrylate | 9%, |
| 2-hydroxyl-3-phenoxy propane acrylate | 4%, |
| the isocyanate curing agent | 2%, |
| photo initiator 184 | 3%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a stainless steel feeler gauge of 0.07-0.1 mm to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C.; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

Example 5

1) Preparation of Hydroxyl-Containing Polyacrylate Prepolymer

A hydroxyl-containing polyacrylate prepolymer was obtained by a free radical polymerization process using the components with the following weight parts as raw materials:

22 parts of n-butyl acrylate,
12 parts of tetrahydrofurfuryl acrylate,
9 parts of hydroxyethyl acrylate,
3 parts of acrylic acid,
4 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 35%, |
| pentaerythritol triacrylate | 7%, |
| 2-hydroxyl-3-phenoxy propane acrylate | 3%, |
| the isocyanate curing agent | 3%, |
| photo initiator 184 | 2%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a 0.07~0.1 mm stainless steel feeler gauge to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

Comparative Example 1

1) Preparation of Hydroxyl-Containing Polyacrylate Prepolymer

A hydroxyl-containing polyacrylate prepolymer was obtained by a free radical polymerization process using the components with the following weight parts as raw materials:

22 parts of n-butyl acrylate,
13 parts of tetrahydrofurfuryl acrylate,
8 parts of hydroxyethyl acrylate,
4 parts of acrylic acid,
3 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours, so as to obtain the hydroxyl-containing polyacrylate prepolymer.

2) Preparation of Polyacrylate Pressure-Sensitive Adhesive

The polyacrylate pressure-sensitive adhesive was composed of the following mass percent content of materials:

| | |
|---|---|
| the hydroxyl-containing polyacrylate prepolymer | 35%, |
| the isocyanate curing agent | 2%, and |
| ethyl acetate | 10%. |

The materials were uniformly dispersed and stirred after being contained in a container, wherein the stirring speed was 500 rpm and the stirring time was 10 min to produce the polyacrylate pressure-sensitive adhesive.

3) Preparation of Explosion-Proof Film

First step: diluting the prepared polyacrylate pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a 0.07~0.1 mm stainless steel feeler gauge to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the diluted pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C.; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

The following were tested for the explosion-proof film prepared using polyacrylate pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

Comparative Example 2

1) Preparation of Hydroxyl-Containing Polyacrylate Prepolymer

A hydroxyl-containing polyacrylate prepolymer was obtained by a free radical polymerization process using the components with the following weight parts as raw materials:

20 parts of n-butyl acrylate,
13 parts of tetrahydrofurfuryl acrylate,
10 parts of hydroxyethyl acrylate,
4 parts of acrylic acid,
3 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours, so as to obtain the hydroxyl-containing polyacrylate prepolymer.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 31%, |
| pentaerythritol triacrylate | 9%, |
| the isocyanate curing agent | 3%, |
| the photo initiator 184 | 3%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the prepared secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a 0.07~0.1 mm stainless steel feeler gauge to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the diluted UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

Comparative Example 3

1) Preparation of Hydroxyl-Containing Polyacrylate Prepolymer

A hydroxyl-containing polyacrylate prepolymer was obtained by a free radical polymerization process using the components with the following weight parts as raw materials:

20 parts of n-butyl acrylate,
13 parts of tetrahydrofurfuryl acrylate,
10 parts of hydroxyethyl acrylate,
4 parts of acrylic acid,
3 parts of benzoyl peroxide, and
50 parts of ethyl acetate.

The temperature of the free radical polymerization reaction was controlled at 80-85° C., the dropping time of the constant pressure funnel was 1.5 hours, and the reflux reaction was lasted for 2.5 hours, so as to obtain the hydroxyl-containing polyacrylate prepolymer.

2) Preparation of Secondary Cured UV Pressure-Sensitive Adhesive

The secondary cured UV pressure-sensitive adhesive was composed of the following mass percent content of materials:

| | |
|---|---|
| the hydroxyl-containing polyacrylate prepolymer | 31%, |
| 2-hydroxyl-3-phenoxy propane acrylate | 4%, |
| the isocyanate curing agent | 3%, |
| photo initiator 184 | 3%, and |
| ethyl acetate | 50%. |

In a light-shielded environment, the materials were uniformly dispersed and stirred after being contained in a black container, wherein the stirring speed was 500 rpm and the stirring time was 10 min to produce the secondary cured UV pressure-sensitive adhesive.

3) Preparation of Explosion-Proof Film

First step: diluting the prepared secondary cured UV pressure-sensitive adhesive with ethyl acetate to a coating solution with a solid content of 22±1%.

Second step: mounting a commercially available 50 μm PET film on the unwinding stand of the coating machine, guiding the film, adjusting the gap between the comma roll and the PET film with a 0.07~0.1 mm stainless steel feeler gauge to the appropriate range; controlling the temperatures of the oven zones as follows: zone 1: 45-50° C., zone 2: 60-70° C., zone 3: 90-100° C., zone 4: 100-110° C., zone 5: 100-110° C., and zone 6: 80-90° C., respectively; coating the diluted UV pressure-sensitive adhesive coating solution onto a surface of a corona layer of the PET film, drying in the coating machine oven, and controlling the thickness of the dry adhesive to 15±1 μm; and during winding, laminating with a PET release film treated with a release agent.

Third step: diluting the ordinary commercially available UV-curable liquid (with brand number of SW3HL from Guangzhou Sunnyvale Technology LLC.) with ethyl acetate to a coating solution with a solid content of 20%; controlling the temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating the diluted UV-curable liquid onto the other surface of the PET film prepared with the pressure-sensitive adhesive layer in the second step, drying in the coating machine oven, controlling the thickness of UV-curable layer to 2-3 μm, and curing with UV light irradiation, with UV light energy controlled at 300-400 mj/cm$^2$; and winding up, and maturing at room temperature for 7 days, thus preparing the explosion-proof film.

The following were tested for the explosion-proof film prepared using secondary cured UV pressure-sensitive adhesive: initial tackiness, 180° peeling strength after 7 days of room temperature maturing, and the presence of residual adhesive of the explosion-proof film upon peeling from the tempered glass after aging for 96 hours under high temperature and high humidity conditions at a temperature of 70±2° C. and a relative humidity of 90%~95%; and the presence of residual adhesive and bubbles of the explosion-proof film upon peeling from tempered glass after aging for 720 h in an oil bath oven at 80±2° C. The test results are shown in Table 1.

The test method is as follows.

Initial adhesion test method: the explosion-proof films prepared by the above examples and comparative examples were tested by using the KJ-6031 series annular initial adhesion tester from Dongguan Kejian Testing Instrument Co., Ltd., following the standard GB/T4852-2002 "Test Method for Initial Adhesion of Pressure-Sensitive Adhesive Tape", with a tensile speed of 300 mm/min.

180° peeling strength test method: the explosion-proof films prepared by the above examples and comparative examples, after the static maturation for 7 days at room temperature (temperature: 23±2° C., relative humidity: 50±5%), were tested by using the KJ-1065 series computerized material tensile testing machine from Dongguan Kejian Testing Instrument Co., Ltd., following the standard GB/T2792-2014 "Test Method for Peeling Strength of Adhesive Tape", with a tensile speed of 300 mm/min.

Test method for performance of resistance to high-temperature and high-humidity aging: the explosion-proof films prepared according to the above examples and comparative examples were attached to tempered glass and placed in the SDH701FA instrument from Chongqing Sida Testing Instrument Co., Ltd. The instrument temperature was set to 70° C., and the humidity was set to 95%. After aging under these high temperature and high humidity conditions for 96 hours, the explosion-proof film was removed and allowed to stand at room temperature for 2 hours. Whether there was any residual adhesive when the explosion-proof film was peeled off on the tempered glass was observed.

Test method for high-temperature resistance: the explosion-proof films prepared according to the above examples and comparative examples were attached to tempered glass and placed in the DU-288 electric heating oil bath oven from Shanghai Experimental Instrument Factory Co., Ltd. The oil temperature was set to 85° C., and the internal temperature of the oven was set to 80° C. After aging for 720 h, the explosion-proof film was removed and allowed to stand at room temperature for 2 hours. Whether there was any residual adhesive and bubbles when the explosion-proof film was peeled off on the tempered glass was observed.

TABLE 1

Test results of initial adhesion, peeling strength, and aging performance for each example and comparative example

| Example | initial adhesion (g/25 mm) | 180° peeling strength (g/25 mm) | resistance to high-temperature and high-humidity aging (70° C., 95%, 96 h) | high temperature resistance (80° C., 720 h) |
|---|---|---|---|---|
| Example 1 | 585.38 | 1210.10 | no residual adhesive | no residual adhesive and no bubbles |
| Example 2 | 658.35 | 1450.60 | no residual adhesive | no residual adhesive and no bubbles |
| Example 3 | 685.58 | 1586.35 | no residual adhesive | no residual adhesive and no bubbles |

TABLE 1-continued

Test results of initial adhesion, peeling strength, and aging performance for each example and comparative example

| Example | initial adhesion (g/25 mm) | 180° peeling strength (g/25 mm) | resistance to high-temperature and high-humidity aging (70° C., 95%, 96 h) | high temperature resistance (80° C., 720 h) |
|---|---|---|---|---|
| Example 4 | 616.65 | 1465.38 | no residual adhesive | no residual adhesive and no bubbles |
| Example 5 | 556.38 | 1462.35 | no residual adhesive | no residual adhesive and no bubbles |
| Comparative Example 1 | 385.80 | 510.85 | presence of residual adhesive | presence of residual adhesive and bubbles |
| Comparative Example 2 | 458.35 | 665.38 | presence of residual adhesive | presence of residual adhesive but no bubbles |
| Comparative Example 3 | 410.20 | 565.38 | presence of residual adhesive | presence of residual adhesive but no bubbles |

The test results are shown in Table 1. Using the secondary cured UV pressure-sensitive adhesive prepared by the solution of the present disclosure to prepare the explosion-proof film, the initial adhesion and 180° peeling strength of the examples are greater than those of the comparative examples from examples 1 to 5 as compared to comparative examples 1 to 3. The performance of resistance to high-temperature and high-humidity aging is better than that of the comparative examples 1 to 3, and there is no residual adhesive phenomenon, while the comparative examples 1 to 3 show residual adhesive. In terms of high temperature resistance, examples 1 to 5 all show no presence of residual adhesive and bubbles, while the presence of residual adhesive and bubbles is found in comparative example 1. The presence of residual adhesive but no bubbles are found in comparative example 2 and comparative example 3.

As can be seen from the results in Table 1, the cohesive strength of the UV pressure-sensitive adhesive is improved by the secondary curing reaction. It not only improves the peeling strength of pressure-sensitive adhesive, but also avoids the phenomenon of residual adhesive and bubbles, which meets the production and use performance requirements of the explosion-proof film.

The foregoing are merely preferred embodiments of the present disclosure. It should be pointed out that those skilled in the art may make several modifications and improvements without departing from the concept of the present disclosure, and these all belong to the protection scope of the present.

INDUSTRIAL PRACTICALITY

The present disclosure provides a secondary cured UV pressure-sensitive adhesive, an explosion-proof film and preparation methods for the above two. The secondary cured UV pressure-sensitive adhesive of the present disclosure is prepared by carrying out a thermal curing cross-linking reaction of a hydroxyl-containing polyacrylate prepolymer, pentaerythritol triacrylate, and 2-hydroxyl-3-phenoxy propane acrylate by using an isocyanate curing agent, and initiating a free radical polymerization of pentaerythritol triacrylate and 2-hydroxyl-3-phenoxy propane acrylate by using photo initiator 184. The thermal curing endows the pressure-sensitive adhesive with a relatively high initial adhesion, and the photo-curing endows the pressure-sensitive adhesive with a relatively high cohesive strength, reducing the risk of adhesive residue of the explosion-proof film on the surface of a protected material. Therefore, it has excellent industrial utility performance.

What is claimed is:

1. A secondary cured UV pressure-sensitive adhesive, composed of following mass percent contents of materials:

| | |
|---|---|
| a hydroxyl-containing polyacrylate prepolymer | 31-35%, |
| pentaerythritol triacrylate | 6-9%, |
| 2-hydroxyl-3-phenoxy propane acrylate | 3-5%, |
| an isocyanate curing agent | 2-3%, |
| 1-hydroxycyclohexyl phenyl ketone | 2-3%, and |
| ethyl acetate | 50%, wherein |

a cross-linking and curing of the UV pressure-sensitive adhesive is accomplished by following steps: firstly, a thermal curing cross-linking reaction between the hydroxyl-containing polyacrylate prepolymer, pentaerythritol triacrylate and 2-hydroxyl-3-phenoxy propane acrylate is carried out by using the isocyanate curing agent, to form an interpenetrating network structure; and secondly, under UV irradiation, a free radical polymerization of pentaerythritol triacrylate and 2-hydroxyl-3-phenoxy propane acrylate is initiated by using 1-hydroxycyclohexyl phenyl ketone, to complete a photo-curing cross-linking reaction.

2. The secondary cured UV pressure-sensitive adhesive according to claim 1, wherein the hydroxyl-containing polyacrylate prepolymer is prepared by raw materials of following parts by weight: 20 to 23 parts of n-butyl acrylate, 10 to 13 parts of tetrahydrofurfuryl acrylate, 8 to 10 parts of hydroxyethyl acrylate, 3 to 4 parts of acrylic acid, 3 to 4 parts of benzoyl peroxide, and 50 parts of ethyl acetate.

3. The secondary cured UV pressure-sensitive adhesive according to claim 1, wherein the secondary cured UV pressure-sensitive adhesive has a solid content of 22±1%; under environmental conditions of 23±1° C. and relative humidity of 55±5%, a thickness of the adhesive is 15±1 μm, and a 180° peeling strength on a 50 μm PET film is ≥1200 g/25 mm; a transparency is ≥90%, and a haze is ≤1.5%; after aging for 96 h under high temperature and high humidity conditions of a temperature of 70±2° C. and a relative humidity of 90%~95%, no residual adhesive exists when the PET film is peeled off from a tempered glass; and after aging for 720 h in an 80±2° C. oil bath oven, no residual adhesive or bubble exists when the PET film is peeled off from the tempered glass.

4. A preparation method for the secondary cured UV pressure-sensitive adhesive according to claim 1, wherein the method comprises following steps:

1) Synthesis of a hydroxyl-containing polyacrylate prepolymer, comprising: according to weight parts, weighing 20 to 23 parts of n-butyl acrylate, 10 to 13 parts of tetrahydrofurfuryl acrylate, 8 to 10 parts of hydroxyethyl acrylate, 3 to 4 parts of acrylic acid, 3 to 4 parts of benzoyl peroxide, respectively; adding them to a four-neck flask, and mixing them evenly with 50 parts of ethyl acetate; and subjecting a resultant to random copolymerization using a free radical polymerization process to obtain the hydroxyl-containing polyacrylate prepolymer; and 2) Preparation of the secondary cured UV pressure-sensitive adhesive, comprising: according to mass percent content, weighing the hydroxyl-containing polyacrylate prepolymer at 31%~35%, pentaerythritol triacrylate at 6%~9%, 2-hydroxyl-3-phenoxy propane acrylate at 3%~5%, isocyanate curing agent at 2%~3%, 1-hydroxycyclohexyl phenyl ketone at 2%~3%, and ethyl acetate at 50%, respectively; and in a light-shielded environment, uniformly dispersing and stirring after contained in a black container to obtain the secondary cured UV pressure-sensitive adhesive.

5. The preparation method for the secondary cured UV pressure-sensitive adhesive according to claim 4, wherein the free radical polymerization process comprises: transferring a monomer mixture solution to a constant-pressure dropping funnel, and respectively mounting a 1000 ml four-neck flask, a stirring paddle, a spherical condenser tube, a thermometer, and the constant-pressure dropping funnel on a constant-temperature water bath at 80±5° C.; dripping the monomer mixture solution, accounting for 15% by mass, into the four-neck flask; stirring and reacting for 10 to 15 minutes until a temperature of reactants rises above 90° C.; dripping, when a viscosity increases, the monomer mixture solution from the constant-pressure dropping funnel; controlling a dripping rate, and stabilizing a reaction temperature at 80±5° C.; after completing the dripping, continuing refluxing and reacting for 1.5 to 2.5 hours, then stopping heating the reaction, and cooling down, so as to obtain the hydroxyl-containing polyacrylate prepolymer.

6. A preparation method for an explosion-proof film, comprising coating the secondary cured UV pressure-sensitive adhesive according to claim 1 on a surface of a 50 μm PET film by using a comma roll coating method, and after drying in a coating machine oven, laminating with a PET release film during winding; then, on the other surface of the PET film containing the pressure-sensitive adhesive, coating a UV-curable liquid on the surface of the PET film by using a micro-concave roll coating method; and after drying in the coating machine oven, curing with UV light irradiation, winding up, and maturing at room temperature for 7 days, to prepare the explosion-proof film.

7. The preparation method for the explosion-proof film according to claim 6, comprising following steps 1) Preparation of a coating solution of the second cured UV pressure-sensitive adhesive, comprising: diluting the secondary cured UV pressure-sensitive adhesive with ethyl acetate to the coating solution with a solid content of 22±1%;

2) Coating of a UV pressure-sensitive adhesive layer: mounting the 50 μm PET film on an unwinding stand of a coating machine, guiding the film, adjusting a gap between a comma roll and the PET film with a stainless steel feeler gauge to an appropriate range; controlling temperatures of oven zones as follows: zone 1: 45-50° C., zone 2: 60-70° C., zone 3: 90-100° C., zone 4: 100-110° C., zone 5: 100-110° C., and zone 6: 80-90° C., respectively; coating the coating solution of the UV pressure-sensitive adhesive onto a surface of a corona layer of the PET film, drying in the coating machine oven, and controlling a thickness of a dry adhesive to 15±1 μm; and during winding, laminating with a PET release film treated with a release agent; and 3) Coating of the UV-curable layer: diluting the UV-curable liquid with ethyl acetate to a coating solution with a solid content of 20%; controlling temperatures of the oven zones as follows: zone 1: 40-45° C., zone 2: 55-60° C., zone 3: 70-80° C., zone 4: 85-90° C., zone 5: 85-95° C., and zone 6: 80-85° C. respectively; coating a diluted UV-curable liquid onto the other surface of the PET film prepared with the pressure-sensitive adhesive layer in the second step, drying in the coating machine oven, controlling a thickness of a UV-curable layer to 2-3 μm, and curing with UV light irradiation, with UV light energy controlled at 300-400 mj/cm$^2$; and winding up, and maturing at room temperature for 7 days, to prepare the explosion-proof film.

8. The preparation method for the explosion-proof film according to claim 6, wherein the corona layer of the PET film is obtained by a corona discharge treatment of the PET film.

9. The secondary cured UV pressure-sensitive adhesive according to claim 2, wherein the secondary cured UV pressure-sensitive adhesive has a solid content of 22±1%; under environmental conditions of 23±1° C. and relative humidity of 55±5%, a thickness of the adhesive is 15±1 μm, and a 180° peeling strength on a 50 μm PET film is ≥1200 g/25 mm; a transparency is ≥90%, and a haze is ≤1.5%; after aging for 96 h under high temperature and high humidity conditions of a temperature of 70±2° C. and a relative humidity of 90%~95%, no residual adhesive exists when the PET film is peeled off from a tempered glass; and after aging for 720 h in an 80±2° C. oil bath oven, no residual adhesive or bubble exists when the PET film is peeled off from the tempered glass.

* * * * *